(12) United States Patent
Kieliszewski

(10) Patent No.: US 8,521,382 B2
(45) Date of Patent: Aug. 27, 2013

(54) TRANSMISSION OIL TEMPERATURE ESTIMATION SYSTEMS AND METHODS

(75) Inventor: Mark David Kieliszewski, Lake Orion, MI (US)

(73) Assignee: GM Global Technology Operations LLC

( * ) Notice: Subject to any disclaimer, the term of this patent is extended or adjusted under 35 U.S.C. 154(b) by 235 days.

(21) Appl. No.: 12/891,052

(22) Filed: Sep. 27, 2010

(65) Prior Publication Data

US 2012/0053800 A1 Mar. 1, 2012

Related U.S. Application Data

(60) Provisional application No. 61/378,163, filed on Aug. 30, 2010.

(51) Int. Cl.
*G06F 19/00* (2011.01)
(52) U.S. Cl.
USPC .......... 701/60; 701/51; 701/53; 701/54; 701/55; 701/58; 123/350; 123/478
(58) Field of Classification Search
None
See application file for complete search history.

(56) References Cited

U.S. PATENT DOCUMENTS

| | | | |
|---|---|---|---|
| 4,975,628 A * | 12/1990 | Lemieux | 318/599 |
| 5,048,495 A * | 9/1991 | Onari et al. | 123/492 |
| 5,819,194 A * | 10/1998 | Hara et al. | 701/89 |
| 5,855,533 A * | 1/1999 | Tolkacz et al. | 477/110 |
| 6,231,478 B1 * | 5/2001 | Sakai | 477/111 |
| 6,236,925 B1 * | 5/2001 | Gierling et al. | 701/53 |
| 6,308,516 B1 * | 10/2001 | Kamada | 60/450 |
| 6,352,146 B1 * | 3/2002 | Eismann et al. | 192/3.58 |
| 6,504,474 B1 * | 1/2003 | Goodnight et al. | 340/439 |
| 6,594,573 B1 * | 7/2003 | Rossmann et al. | 701/67 |
| 6,611,781 B1 * | 8/2003 | Gutmann | 702/148 |
| 6,877,486 B2 * | 4/2005 | Ellies et al. | 123/478 |
| 7,077,783 B2 * | 7/2006 | Senger et al. | 477/98 |
| 8,052,577 B2 * | 11/2011 | Tamba et al. | 477/168 |
| 8,140,230 B2 * | 3/2012 | Haggerty et al. | 701/54 |
| 2004/0204281 A1 * | 10/2004 | Wakayama | 475/161 |
| 2005/0056260 A1 * | 3/2005 | Ellies et al. | 123/478 |
| 2005/0278103 A1 * | 12/2005 | Higashimata et al. | 701/67 |
| 2009/0054206 A1 * | 2/2009 | Tamba et al. | 477/168 |
| 2009/0132135 A1 * | 5/2009 | Quinn et al. | 701/55 |
| 2010/0087996 A1 * | 4/2010 | Haggerty et al. | 701/58 |
| 2010/0102767 A1 * | 4/2010 | Endo et al. | 318/453 |
| 2010/0262352 A1 * | 10/2010 | Kuwahara et al. | 701/102 |
| 2010/0313849 A1 * | 12/2010 | Stoner et al. | 123/350 |
| 2011/0084638 A1 * | 4/2011 | Patel et al. | 318/400.32 |
| 2011/0153144 A1 * | 6/2011 | Dlugoss et al. | 701/29 |

* cited by examiner

*Primary Examiner* — Khoi Tran
*Assistant Examiner* — Jonathan L Sample

(57) ABSTRACT

A system for a vehicle includes a filter module and a coefficient determination module. The filter module generates a valve body oil temperature signal as a function of a transmission oil temperature signal, the valve body oil temperature signal, and a filter coefficient. The coefficient determination module varies the filter coefficient based on the valve body oil temperature signal. The transmission oil temperature signal corresponds to a first temperature of transmission oil measured at a location between a torque converter and a variable bleed solenoid (VBS). The valve body oil temperature signal corresponds to a second temperature of transmission oil provided to a clutch of a transmission from a valve body.

16 Claims, 4 Drawing Sheets

TRANSMISSION OIL TEMPERATURE ESTIMATION SYSTEMS AND METHODS

CROSS-REFERENCE TO RELATED APPLICATIONS

This application claims the benefit of U.S. Provisional Application No. 61/378,163, filed on Aug. 30, 2010. The disclosure of the above application is incorporated herein by reference in its entirety.

FIELD

The present disclosure relates to vehicle transmissions and more particularly to clutch-to-clutch transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque, which is output to a transmission. An automatic transmission of a vehicle may include a plurality of fluid controlled friction devices, such as clutches. A control module may engage and disengage one or more of the clutches according to a predefined pattern to establish different gear ratios (also called speed ratios) within the transmission.

A gear ratio may be defined in terms of a ratio of a transmission input shaft speed divided by a transmission output shaft speed. A gear shift from one gear ratio to another gear ratio involves disengaging a first clutch that is associated with the current or actual gear ratio, and engaging a second clutch associated with a next gear ratio. The clutch to be disengaged during the gear shift is referred to as the offgoing clutch, and the clutch to be engaged during the gear shift is referred to as the oncoming clutch. Gear shifts of this type may be referred to as clutch-to-clutch shifts because no speed responsive or freewheeling elements are used.

SUMMARY

A system for a vehicle includes a filter module and a coefficient determination module. The filter module generates a valve body oil temperature signal as a function of a transmission oil temperature signal, the valve body oil temperature signal, and a filter coefficient. The coefficient determination module varies the filter coefficient based on the valve body oil temperature signal. The transmission oil temperature signal corresponds to a first temperature of transmission oil measured at a location between a torque converter and a variable bleed solenoid (VBS). The valve body oil temperature signal corresponds to a second temperature of transmission oil provided to a clutch of a transmission from a valve body.

A method for a vehicle includes generating a valve body oil temperature signal as a function of a transmission oil temperature signal, the valve body oil temperature signal, and a filter coefficient and varying the filter coefficient based on the valve body oil temperature signal. The transmission oil temperature signal corresponds to a first temperature of transmission oil measured at a location between a torque converter and a variable bleed solenoid (VBS). The valve body oil temperature signal corresponds to a second temperature of transmission oil provided to a clutch of a transmission from a valve body.

Another method for a vehicle includes: outputting a valve body oil temperature signal from a filter; inputting a previous value of the valve body oil temperature signal, a transmission oil temperature signal, and a filter coefficient to the filter; and varying the filter coefficient based on the valve body oil temperature signal. The transmission oil temperature signal corresponds to a first temperature of transmission oil measured at a location between a torque converter and a variable bleed solenoid (VBS). The valve body oil temperature signal corresponds to a second temperature of transmission oil provided to a clutch of a transmission from a valve body.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
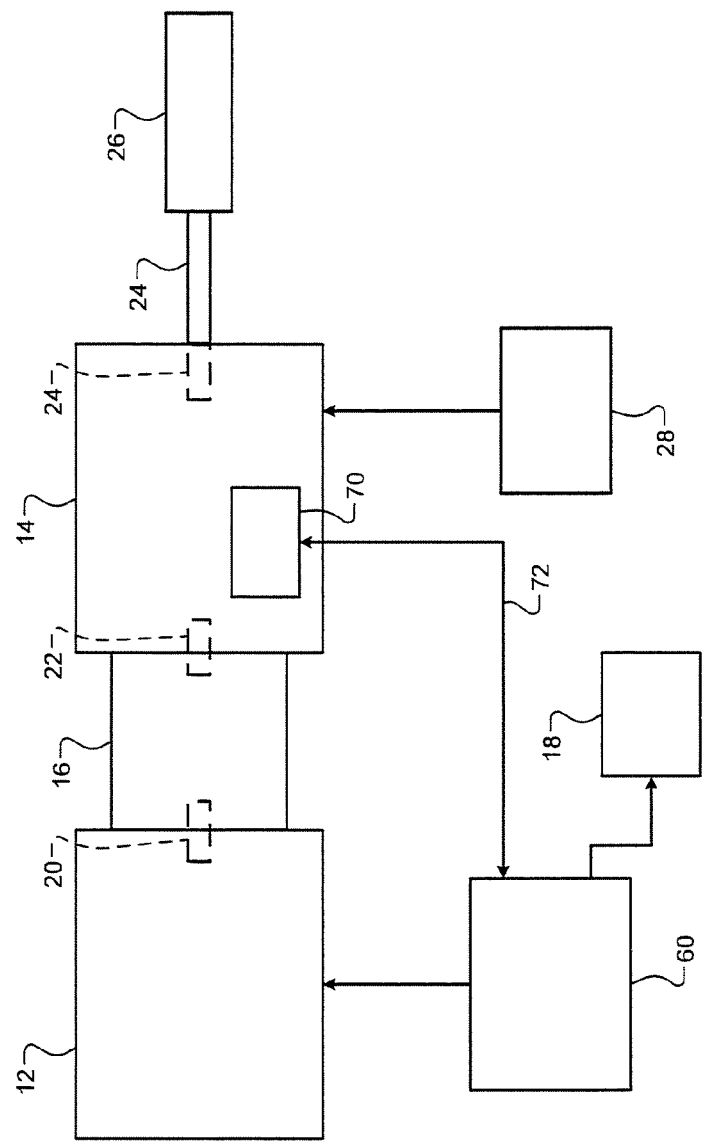
FIG. 1 is a functional block diagram of an example vehicle system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to, is part of, or includes an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A pump pumps transmission oil from a transmission oil source (e.g., a sump) to a valve body and to a torque converter. The transmission oil flows between the valve body and one or more clutches of a transmission. One or more variable bleed solenoids (VBSs) regulate the flow of the transmission oil back to the source from the valve body and from the torque converter. A transmission oil temperature sensor measures temperature of the transmission oil at a location between the torque converter and the VBSs.

A control module (e.g., a transmission control module) controls the pressure of the transmission oil provided to the clutches (i.e., clutch pressures) of the transmission. The control module may control the clutch pressures based on the temperature measured using the transmission oil temperature sensor. However, when a vehicle is started, the temperature of the transmission oil within the source is generally less than the measured transmission oil temperature. The measured transmission oil temperature being greater than the temperature of the transmission oil within the source may be attributable to heat absorption within the torque converter.

The control module of the present disclosure estimates the temperature of the transmission oil output from the valve body. The control module applies a recursive, first-order lag filter (e.g., a Kalman filter) to the measured transmission oil temperature to estimate the temperature of the transmission oil output from the valve body. The control module controls the clutch pressures based on the estimated temperature of the transmission oil output from the valve body.

Referring now to FIG. 1, a functional block diagram of an example vehicle system 10 is presented. An internal combustion engine 12 drives a transmission 14 via a torque converter 16. The engine 12 may include, for example, a spark-combustion type engine, a compression-combustion type engine, and/or another suitable type of engine. A vehicle may also include one or more electric motors and/or motor generator units (MGUs) 18.

The engine 12 outputs torque to the torque converter 16 via an engine output shaft 20, such as a crankshaft. The torque converter 16 supplies torque to the transmission 14 via a transmission input shaft 22. While the transmission 14 will be discussed as including a clutch-to-clutch type transmission, the transmission 14 may include another suitable type of transmission, such as a dual clutch transmission (DCT) or another type of automatic transmission.

The transmission 14 may include one or more gearsets (not shown) through which torque may be transferred between the transmission input shaft 22 and a transmission output shaft 24. The transmission output shaft 24 drives a driveline 26 of the vehicle system 10, and the driveline 26 transfers torque to wheels (not shown) of the vehicle.

A range selector 28 enables a user to select a mode of operation of the transmission 14 including, but not limited to, a park mode, a reverse mode, a neutral mode, or one or more forward drive modes. The transmission 14 may be capable of achieving a plurality of gear ratios. For example only, the transmission 14 may be capable of achieving six forward gear ratios, a reverse gear ratio, and a neutral gear ratio. The transmission 14 may be capable of achieving a greater or lesser number of forward gear ratios and/or a greater number of reverse gear ratios in various implementations. A gear ratio may be defined as the ratio between the rotational speed of the transmission input shaft 22 and the rotational speed of the transmission output shaft 24.

An engine control module (ECM) 60 controls operation of the engine 12. The ECM 60 or another control module (not shown) may control operation of the one or more MGUs 18 in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data via a connection 72.

Figure 2:
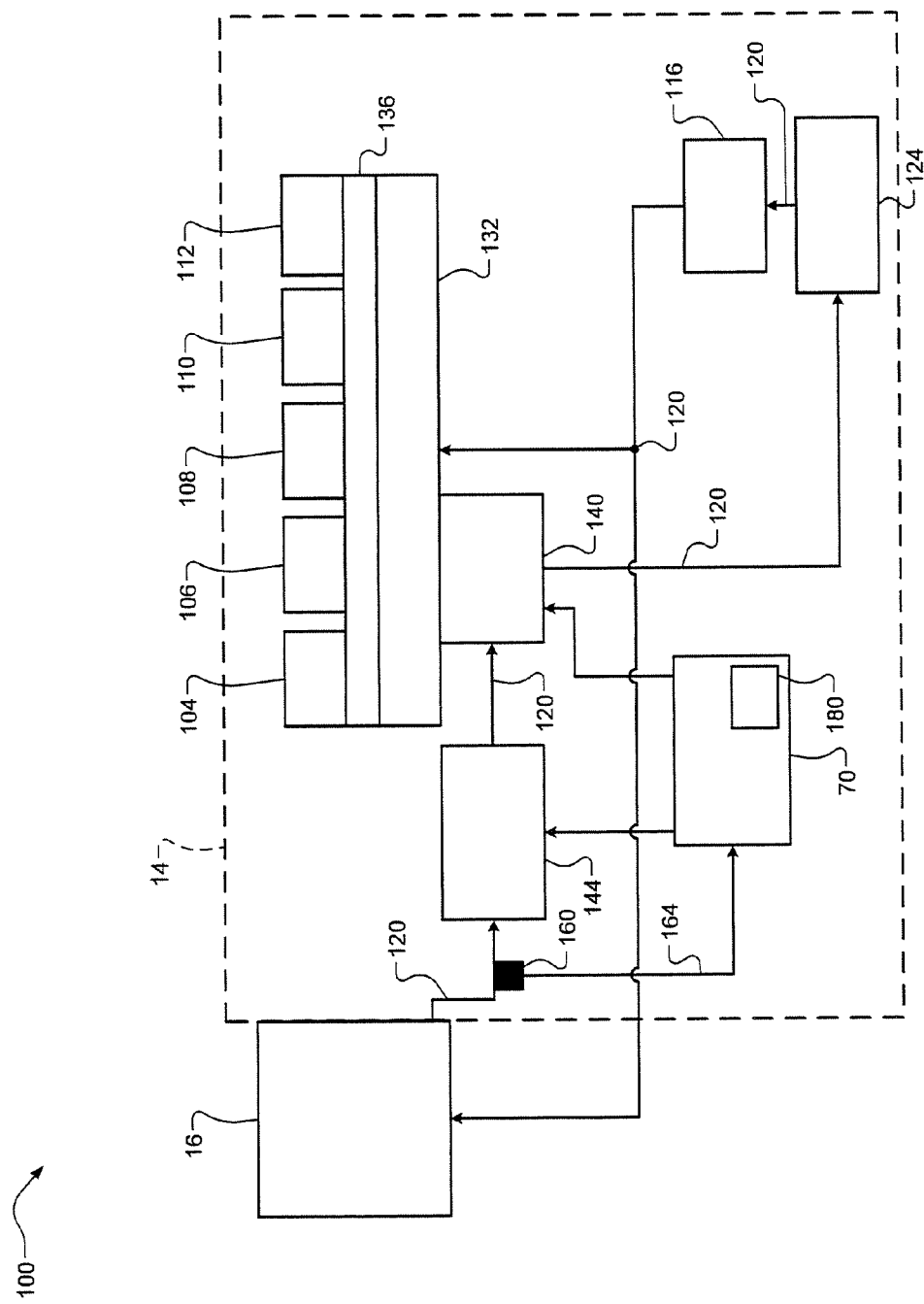
FIG. 2 is a functional block diagram of an example transmission system according to the principles of the present disclosure.

Referring now to FIG. 2, a functional block diagram of an example implementation of a transmission system 100 is presented. The transmission 14 includes a plurality of clutches, such as first, second, third, fourth, and fifth clutches 104, 106, 108, 110, and 112, respectively. The transmission 14 may include a greater or fewer number of clutches. The first, second, third, fourth, and fifth clutches 104-112 will be collectively referred to hereafter as the clutches 104-112.

The clutches 104-112 control which one of the gear sets is engaged within the transmission 14 at a given time. In other words, the clutches 104-112 control the gear ratio at a given time. Different gear ratios may be established when different combinations of one or more of the clutches 104-112 are engaged. An example table of clutch engagement combinations that may establish various gear ratios is provided below.

| Gear Ratio/Range | Clutches Engaged | | | | |
| --- | --- | --- | --- | --- | --- |
| | 30 | 32 | 34 | 36 | 38 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

For example only, a first forward gear ratio may be established when the first and fifth clutches 104 and 112 are engaged. A second forward gear ratio may be established when the first and fourth clutches 104 and 110 are engaged. A third forward gear ratio may be established when the first and third clutches 104 and 108 are engaged. A fourth forward gear ratio may be established when the first and second clutches 104 and 106 are engaged. A fifth forward gear ratio may be established when the second and third clutches 106 and 108 are engaged. A sixth forward gear ratio may be established when the second and fourth clutches 106 and 110 are engaged. The reverse gear ratio may be established when the third and fifth clutches 108 and 112 are engaged. The neutral gear ratio may be established when only the fifth clutch 112 is engaged. As the numerical title attributed to the forward gear ratios increases, the gear ratio (i.e., ratio of transmission input speed over transmission output speed) decreases. For example only, the gear ratio associated with the first forward gear ratio is greater than the gear ratio associated with the second gear ratio.

A gear shift between successive forward gear ratios is accomplished by disengaging a first one of the clutches 104-112 and engaging a second one of the clutches 104-112 while maintaining the engagement of a third one of the clutches 104-112. The engagement and the disengagement of the first and second ones of the clutches 104-112 may be performed in concert.

For example only, a gear shift from the first forward gear ratio to the second forward gear ratio may be accomplished by disengaging the fifth clutch 112, engaging the fourth clutch 110, and maintaining the first clutch 104 as engaged. A gear shift from the second forward gear ratio to the third forward gear ratio may be accomplished by disengaging the fourth clutch 110, engaging the third clutch 108, and maintaining the first clutch 104 as engaged. A gear shift from the third forward gear ratio to the fourth forward gear ratio may be accomplished by disengaging the third clutch 108, engaging the second clutch 106, and maintaining the first clutch 104 as engaged. A gear shift from the fourth forward gear ratio to the fifth forward gear ratio may be accomplished by disengaging the first clutch 104, engaging the third clutch 108, and maintaining the second clutch 106 as engaged. A gear shift from the fifth forward gear ratio to the sixth forward gear ratio may be accomplished by disengaging the third clutch 108, engaging the fourth clutch 110, and maintaining the second clutch 106 as engaged.

Transmission oil 120 or another suitable fluid is directed to and from ones of the clutches 104-112 to control engagement and disengagement of the ones of the clutches 104-112. A pump 116 draws the transmission oil 120 from a sump 124 or another suitable transmission oil source. The pump 116 pressurizes the transmission oil 120 and provides pressurized transmission oil to a valve body 132 and to the torque converter 16. The valve body 132 includes one or more valves (not shown) that direct the transmission oil 120 to/from ones of the clutches 104-112 via passages (not shown) formed in a clutch plate 136.

One or more variable bleed solenoids (VBSs) 140 are coupled to the valve body 132. The VBSs 140 may allow some of the transmission oil 120 bleed from the valve body 132 (at a relatively higher pressure) back to the sump 124 (at a relatively lower pressure). In this manner, the VBSs 140 control the flow of the transmission oil 120 from the valve body 132 back to the sump 124. The TCM 70 controls the VBSs 140. The TCM 70 may control the VBSs 140, for example, to regulate pressure within the valve body 132 and to control the flow of the transmission oil 120 to/from one or more of the clutches 104-112.

As stated above, the pump 116 also provides the transmission oil 120 to the torque converter 16. More specifically, the pump 116 may provide the transmission oil 120 to a clutch (not shown) of the torque converter 16. Opening of a feed valve 144 controls the flow of the transmission oil 120 from the torque converter 16 to the VBSs 140. The TCM 70 may control the feed valve 144. The VBSs 140 may also allow some of the transmission oil 120 to bleed from the torque converter 16 (at a relatively higher pressure) back to the sump 124 (at a relatively lower pressure). For a period after a vehicle startup, the temperature of the transmission oil 120 flowing from the torque converter 16 to the VBSs 140 is generally greater than the temperature of the transmission oil 120 within the sump 124. Accordingly, the transmission oil 120 flowing from the torque converter 16 to the VBSs 140 is also generally warmer than the transmission oil 120 flowing from the valve body 132.

The TCM 70 controls the pressure of the transmission oil 120 provided to each of the clutches 104-112 to control the gear ratio engaged within the transmission 14 and to control shifts between two gear ratios (i.e., gear shifts). The TCM 70 controls the pressure of the transmission oil 120 provided to each of the clutches 104-112 via the VBSs 140. The TCM 70 controls the clutch pressures based on one or more measured temperatures.

A transmission oil temperature sensor 160 measures the temperature of the transmission oil 120 between the torque converter 16 and the VBSs 140. For example only, the transmission oil temperature sensor 160 may measure the temperature of the transmission oil 120 at a location between the torque converter 16 and the feed valve 144 or at a location between the feed valve 144 and the VBSs 140. The transmission oil temperature sensor 160 generates a transmission oil temperature signal 164 based on the temperature of the transmission oil 120.

Figure 3:
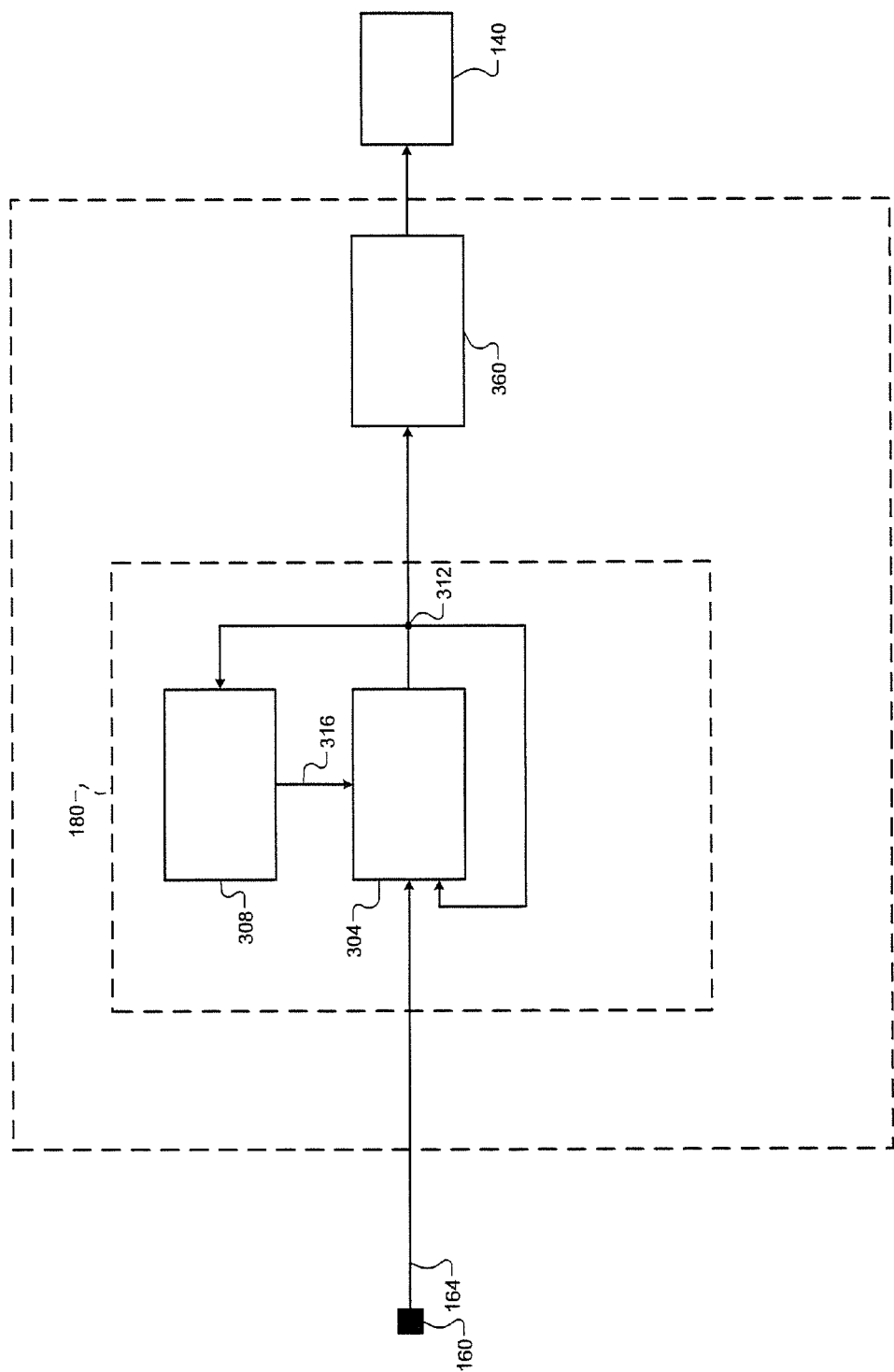
FIG. 3 is a functional block diagram of an example valve body temperature estimation module according to the principles of the present disclosure.

The TCM 70 includes an oil temperature estimation module 180 (see also FIG. 3). The oil temperature estimation module 180 estimates the temperature of the transmission oil 120 output from the valve body 132. The temperature of the oil output from the valve body 132 will hereafter be referred to as the valve body oil temperature. The oil temperature estimation module 180 estimates the valve body oil temperature based on the transmission oil temperature measured using the transmission oil temperature sensor 160.

Referring now to FIG. 3, a functional block diagram of an example implementation of the oil temperature estimation module 180 is presented. The oil temperature estimation module 180 includes a filter module 304 and a coefficient determination module 308.

The filter module 304 receives the transmission oil temperature signal 164 from the transmission oil temperature sensor 160. The filter module 304 generates a valve body oil temperature signal 312 that corresponds to the valve body oil temperature. The filter module 304 generates the valve body oil temperature signal 312 based on the transmission oil temperature signal 164, the value of the valve body oil temperature signal 312 from the last control loop, and a filter coefficient 316. The filter module 304 generates the valve body oil temperature signal 312 using a recursive, first-order lag filter. The recursive, first-order lag filter may include a Kalman filter. In various implementations, the filter module 304 may use a value of the valve body oil temperature signal 312 from a previous control loop other than the last control loop.

For example only, the filter module 304 may generate the valve body oil temperature signal 312 using the equation:

$$VBOT = LastVBOT + (LastVBOT - TransOT) * FC,$$

where VBOT is the valve body oil temperature signal 312 for the present control loop, LastVBOT is the value of the valve body oil temperature signal 312 from the last control loop, and FC is the filter coefficient 316. The filter module 304 may perform control loops at a predetermined loop rate, such as one control loop per 12.5 milliseconds (ms) or at another suitable loop rate. A buffer (not shown), for example, may be implemented that stores the present value of the valve body oil temperature signal 312 and the last value of the valve body oil temperature signal 312. The present and last values of the valve body oil temperature signal 312 may be updated once per control loop.

The coefficient determination module 308 determines the filter coefficient 316 for the present control loop based on the valve body oil temperature signal 312 from the last control loop. For example only, the coefficient determination module 308 may determine the filter coefficient 316 using one of a mapping and a function that relates the filter coefficient 316 to the value of the valve body oil temperature signal 312 from the last control loop. The coefficient determination module 308 increases the filter coefficient 316 as the value of the valve body oil temperature signal 312 increases and vice versa. In this manner, at higher values of the valve body temperature, the magnitude of possible changes in the valve body oil temperature signal 312 increases, and vice versa. The filter coefficient 316 increases, and therefore less filtering is performed by the filter module 304, as the valve body oil temperature signal 312 approaches the transmission oil temperature signal 164 after a vehicle startup.

The TCM 70 may also include a clutch pressure control module 360. The clutch pressure control module 360 controls one or more clutch pressures based on the valve body oil temperature signal 312. For example only, the clutch pressure control module 360 may control one or more clutch pressures as a function of the valve body oil temperature signal 312.

Figure 4:
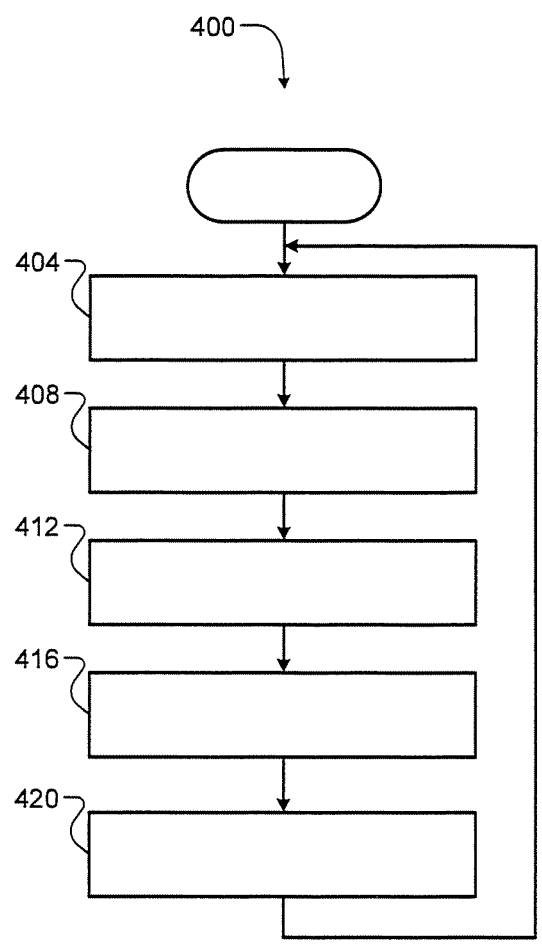
FIG. 4 is a flowchart depicting an example method of estimating a valve body transmission oil temperature according to the principles of the present disclosure.

Referring now to FIG. 4, a flowchart depicting an example method 400 of generating the valve body oil temperature signal 312 is presented. Control begins with 404 where control receives the transmission oil temperature signal 164. Control proceeds with 408 where control determines the filter coefficient 316. Control determines the filter coefficient 316 based on the value of the valve body oil temperature signal 312 from the last control loop.

At 412, control generates the valve body oil temperature signal 312. Control generates the valve body oil temperature signal 312 based on the value of the valve body oil temperature signal 312 from the last control loop, the transmission oil temperature signal 164, and the filter coefficient 316. Control generates the valve body oil temperature signal 312 using a recursive, first-order lag filter. Control may generate the valve body oil temperature signal 312 using the equation described above. Control sets the last value of the valve body oil temperature signal equal to the valve body oil temperature signal 312 at 416. In this manner, control updates the last value of the valve body oil temperature signal 312 for use during the next control loop at 416. Control controls one or more clutch pressures based on the valve body oil temperature signal 312 at 420, and control returns to 404.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
   a first electronic circuit that generates a valve body oil temperature signal as a function of a transmission oil temperature signal, a previous value of the valve body oil temperature signal, and a filter coefficient,
   wherein the transmission oil temperature signal corresponds to a first temperature of transmission oil measured at a location between a torque converter and a variable bleed solenoid (VBS), and
   wherein the valve body oil temperature signal corresponds to a second temperature of transmission oil provided to a clutch of a transmission from a valve body; and
   a second electronic circuit that varies the filter coefficient based on the valve body oil temperature signal.

2. The system of claim 1 wherein the second electronic circuit increases the filter coefficient when the valve body oil temperature signal increases.

3. The system of claim 1 wherein the second electronic circuit decreases the filter coefficient when the valve body oil temperature decreases.

4. The system of claim 1 wherein the second electronic circuit generates the filter coefficient using one of a function and a mapping that relates the valve body oil temperature signal to the filter coefficient.

5. The system of claim 1 wherein the first electronic circuit sets the valve body oil temperature signal equal to a sum of the valve body oil temperature signal and a product of the filter coefficient and a difference between the valve body oil temperature signal and the transmission oil temperature signal.

6. The system of claim 1 wherein the first electronic circuit generates the valve body oil temperature signal using a Kalman filter.

7. The system of claim 1 further comprising a third electronic circuit that controls a pressure of the transmission oil provided to the clutch based on the valve body oil temperature signal.

8. A method for a vehicle, comprising:
   generating, using a filter module, a valve body oil temperature signal as a function of a transmission oil temperature signal, a previous value of the valve body oil temperature signal, and a filter coefficient,
   wherein the transmission oil temperature signal corresponds to a first temperature of transmission oil measured at a location between a torque converter and a variable bleed solenoid (VBS), and
   wherein the valve body oil temperature signal corresponds to a second temperature of transmission oil provided to a clutch of a transmission from a valve body; and
   varying, using a coefficient determination module, the filter coefficient based on the valve body oil temperature signal.

9. The method of claim 8 further comprising increasing the filter coefficient when the valve body oil temperature signal increases.

10. The method of claim 8 further comprising decreasing the filter coefficient when the valve body oil temperature decreases.

11. The method of claim 8 further comprising generating the filter coefficient using one of a function and a mapping that relates the valve body oil temperature signal to the filter coefficient.

12. The method of claim 8 further comprising setting the valve body oil temperature signal equal to a sum of the valve body oil temperature signal and a product of the filter coefficient and a difference between the valve body oil temperature signal and the transmission oil temperature signal.

13. The method of claim 8 further comprising generating the valve body oil temperature signal using a Kalman filter.

14. The method of claim 8 further comprising controlling a pressure of the transmission oil provided to the clutch based on the valve body oil temperature signal.

15. A method for a vehicle, comprising:
   ouputting, from a filter module, a valve body oil temperature signal;
   inputting, to the filter module, a previous value of the valve body oil temperature signal, a transmission oil temperature signal, and a filter coefficient,
   wherein the transmission oil temperature signal corresponds to a first temperature of transmission oil measured at a location between a torque converter and a variable bleed solenoid (VBS), and
   wherein the valve body oil temperature signal corresponds to a second temperature of transmission oil provided to a clutch of a transmission from a valve body; and
   varying, using a coefficient determination module, the filter coefficient based on the valve body oil temperature signal.

16. The system of claim 1 wherein the first and second electronic circuits include at least one of an Application Specific Integrated Circuit (ASIC), a processor, a combinational logic circuit, and a field programmable gate array (FPGA).

* * * * *